United States Patent
Halbweiss et al.

(10) Patent No.: US 6,312,042 B1
(45) Date of Patent: Nov. 6, 2001

(54) HARD-TOP VEHICLE ROOF

(75) Inventors: Thomas Halbweiss, Marbach; Berthold Klein, Rutesheim; Wojciech Wezyk, Sindelfingen, all of (DE)

(73) Assignees: CTS Fahrzeug Dachsysteme GmbH, Korntal-Muenchingen; Adam Opel, Ruesselsheim, both of (DE)

(*) Notice: Subject to any disclaimer, the term of this patent is extended or adjusted under 35 U.S.C. 154(b) by 0 days.

(21) Appl. No.: 09/609,765

(22) Filed: Jul. 3, 2000

(30) Foreign Application Priority Data

Jul. 2, 1999 (DE) .............................................. 199 30 616

(51) Int. Cl.⁷ ........................................................ B60J 7/00
(52) U.S. Cl. .............. 296/108; 296/107.16; 296/107.17; 296/107.18; 296/107.19; 296/116
(58) Field of Search .............................. 296/108, 107.16, 296/107.17, 107.18, 107.19, 107.2, 196

(56) References Cited

U.S. PATENT DOCUMENTS

| | | | |
|---|---|---|---|
| 3,646,707 | * 3/1972 | Lystad | 49/227 |
| 3,994,524 | * 11/1976 | Lehmann | 296/107 |
| 4,695,089 | * 9/1987 | Fukutomi et al. | 296/107 |
| 4,828,317 | * 5/1989 | Muscat | 296/107 |
| 5,090,764 | * 2/1992 | Kogava et al. | 296/107 |
| 5,429,409 | * 7/1995 | Corder et al. | 296/108 |
| 5,593,202 | * 1/1997 | Corder et al. | 296/108 |
| 5,769,483 | * 6/1998 | Danzl et al. | 296/107 |
| 5,785,375 | * 7/1998 | Alexander et al. | 296/108 |
| 5,810,422 | * 9/1998 | Corder et al. | 296/108 |
| 5,971,470 | * 10/1999 | May et al. | 296/107.16 |
| 6,039,382 | * 3/2000 | Mather et al. | 296/116 |
| 6,139,087 | * 10/2000 | Wolfmaier et al. | 296/107.16 |

FOREIGN PATENT DOCUMENTS 196 42 154   4/1998  (DE).
197 06 397   6/1998  (DE).

* cited by examiner

Primary Examiner—Joseph D. Pape
Assistant Examiner—Kiran B. Patel
(74) Attorney, Agent, or Firm—Crowell & Moring LLP

(57) ABSTRACT

A hardtop vehicle roof has a forward roof section, a rearward roof section and a kinematic adjusting system for adjusting the roof sections between a closed position and a deposited position. The kinematic adjusting system includes a vehicle-fixed first guide link and a guiding element which is guided in the guide link and is connected with one of the roof sections. In order to provide a space-saving, flexibly constructed vehicle roof, a second guide link is swivellable about a vehicle-fixed rotation axis. The guiding element of the roof section is slidingly guided in the first as well as the second guide link.

14 Claims, 10 Drawing Sheets

HARD-TOP VEHICLE ROOF

BACKGROUND OF THE INVENTION

The present invention relates to a hardtop vehicle roof consisting of a forward room section, and a rearward roof section and a kinematic adjusting system for adjusting the roof sections between a closed position covering a vehicle interior and a deposited position opening up the vehicle interior, the kinematic adjusting system comprising a vehicle-fixed guide link and a guiding element operatively guided in the guide link and connected with a roof section.

DE 197 06 397 C1 discloses a hardtop for a convertible which has an upper forward roof section and a rearward rear roof section which can both be adjusted between a closed position and a deposited position opening up the vehicle interior in the upward direction. The transfer from the closed position into the deposited position and vice-versa takes place by way of a kinematic adjusting system which has a folding linkage acting upon the roof sections as well as a vehicle-side guide rod on which a guiding element of the folding linkage is slidingly disposed for transferring the roof sections into the closed and into the deposited position.

The linear translational movement of the guiding element on the slide rod is converted by way of the folding linkage into a rotational movement of the roof sections, whereby, in the deposited position, the roof sections take up a folded-together position. The moving space of the vehicle roof required during the adjusting movement is in this case significantly determined by the position of the slide rail in the vehicle body as well as the rotational movement of the roof sections. It should be taken into account that the required moving space for the vehicle roof should not impair the vehicle interior and must be guided around vehicle-fixed components and assemblies, such as headrests, which requires an approximately circular moving curve. For constructive reasons and for space reasons, however, the moving space and the moving curve of the vehicle roof should be kept as small as possible.

Another lowerable vehicle roof, which consists of a total of three rigid roof sections, is shown in DE 196 42 154 A1. The three roof sections are kinematically coupled to one another, the rearward and the center roof section being deposited in the same direction in the deposited position, and the forward roof section, in contrast, being folded together in the opposite direction. By way of a multi-articulation mechanism, the center roof section is coupled with the rearward roof section and can be displaced from a common roof plane, in which the roof sections are in the closed position, by actuating the articulation mechanism, parallel to the rearward roof section. During the transition from the closed into the deposited position, when the articulation mechanism is operated, the center roof section is swivelled along a circular path into the deposited position in which the center roof section is deposited approximately parallel to the rearward roof section. In order to be able to implement the swivelling movement of the center roof section with respect to the rearward roof section, a relatively large moving space is required.

SUMMARY OF THE INVENTION

An object of the present invention is to provide a lowerable hardtop vehicle roof which requires a minimum of depositing space and can be adjusted on a variably designable moving path between a closed and a deposited position.

According to the invention, this object has been achieved by a roof where a second guide link is provided which is held to be swivellable about a vehicle-fixed axis of rotation, and in that the guiding element connected with the roof section is slidingly guided in the first as well as in the second guide link.

According to the present invention, in addition to the vehicle-fixed first guide link, a second guide link is provided which, however, can be swivelled about a vehicle-fixed axis of rotation. One of the roof sections (normally the rearward roof section) is now slidingly guided in the first as well as the second guide link. Advantageously, as a function of the shape of the guide links as well as of the momentary relative position of the guide links with respect to one another, a high degree of mobility of the roof section can be implemented. As a result, also the moving path of the vehicle roof can be very flexibly adapted to the constructive situations. In addition to the higher flexibility during the transition between the closed into the deposited position, the advantage is achieved that the position of the depositing space for the vehicle roof can be determined in a flexible manner, thereby permitting an optimization of the available trunk space and of the space in the vehicle interior.

The combination of two guide links allows the implementation of a rotary swivelling movement and of a translational sliding movement, in which case the two types of movement can be carried out simultaneously as well as successively. Depending on the shape of the guide links, a freely selectable translational movement can be superimposed on a rotational movement.

In an expedient embodiment, the two guide links are arranged at an angle with respect to one another, whereby a supporting of the roof is achieved in any position of the vehicle roof between the closed and the deposited position. Thereby, an uncontrolled sliding-along into an end position with correspondingly high impact forces caused by the force of the weight is avoided, or at least can be reduced to such an extent that only low holding or guiding forces are required for the transition movement.

In a currently preferred embodiment, the vehicle-fixed first guide link has a partial-circle-shaped section which is expediently adjoined by a linear section. The partial-circle-shaped section advantageously is assigned to a first swivelling movement for opening the vehicle roof, and the linear section is assigned to the subsequent transition of the vehicle roof into the depositing space. The relative position of the second swivellable guide link, in any possible angular position of the second guide link, encloses an angle with the first vehicle-fixed guide link, in which case the vehicle-fixed swivelling axis of the swivellable second guide link preferably coincides with the center point of the partial-circle-shaped section of the vehicle-fixed first link. As a result, the present invention achieves the advantage that the guiding element of the roof section, which is slidingly guided in the two guide links, at least in the area of the partial-circle-shaped section, carries out an exclusive swivelling movement without a translational component. Correspondingly, the roof section connected with the guiding element also carries out an exclusive rotational movement in this section, the axis of rotation of the roof section coinciding with the axis of rotation of the swivellable second guide link.

In the adjoining linear section of the first guide link, mainly a translational movement of the guiding element and of the pertaining roof section is carried out, on which, however, a rotatory component is expediently superimposed. The translational component of the movement is used particularly for the transition of the roof into the depositing space.

By way of the shape particularly of the vehicle-fixed first guide link, virtually any arbitrary movement of the vehicle roof can be implemented. The angular arrangement of the second guide link with respect to the first guide link ensures a transition by means of low adjusting forces.

Between the forward and the rearward roof section, an a articulated connection is advantageously provided by way of which a relative movement of the forward roof section which respect to the rearward roof section can be carried out in order to achieve a closely folded-together position in the deposited state. The articulated connection is preferably constructed as a four-bar kinematic system and permits the transition of the forward roof section into an approximately parallel position which is disposed directly in front of the rearward roof section and in which the two roof sections are deposited in the same direction. Thereby, the two roof sections are situated against one another by way of their convex curvature in a space-saving manner and require a minimum of depositing space. This arrangement allows a depositing behind the seats and in front of the rear axle without any impairment of the trunk situated behind it.

The articulated connection is preferably slidably guided on a slide rail which is connected with the rearward roof section and extends particularly approximately parallel to the roof plane of the rearward roof section. The slide rail permits a normally translational relative movement of the forward roof section with respect to the rearward roof section which can be combined with the swivelling movement generated by way of the four-bar mechanism. That is, first the forward roof section is displaced in parallel from the common plane with the rearward roof section by way of the four-bar mechanism and subsequently the forward roof section is displaced parallel to the rearward roof section along the slide rail. The articulated connection and the displacement on the slide rail are advantageously carried out by different drives which differ particularly from the drive required for the movement of the rearward roof section in the guide links.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

In the embodiments illustrated in FIGS. 1 to 10, identical components are provided with the same reference numbers.

Figure 1:
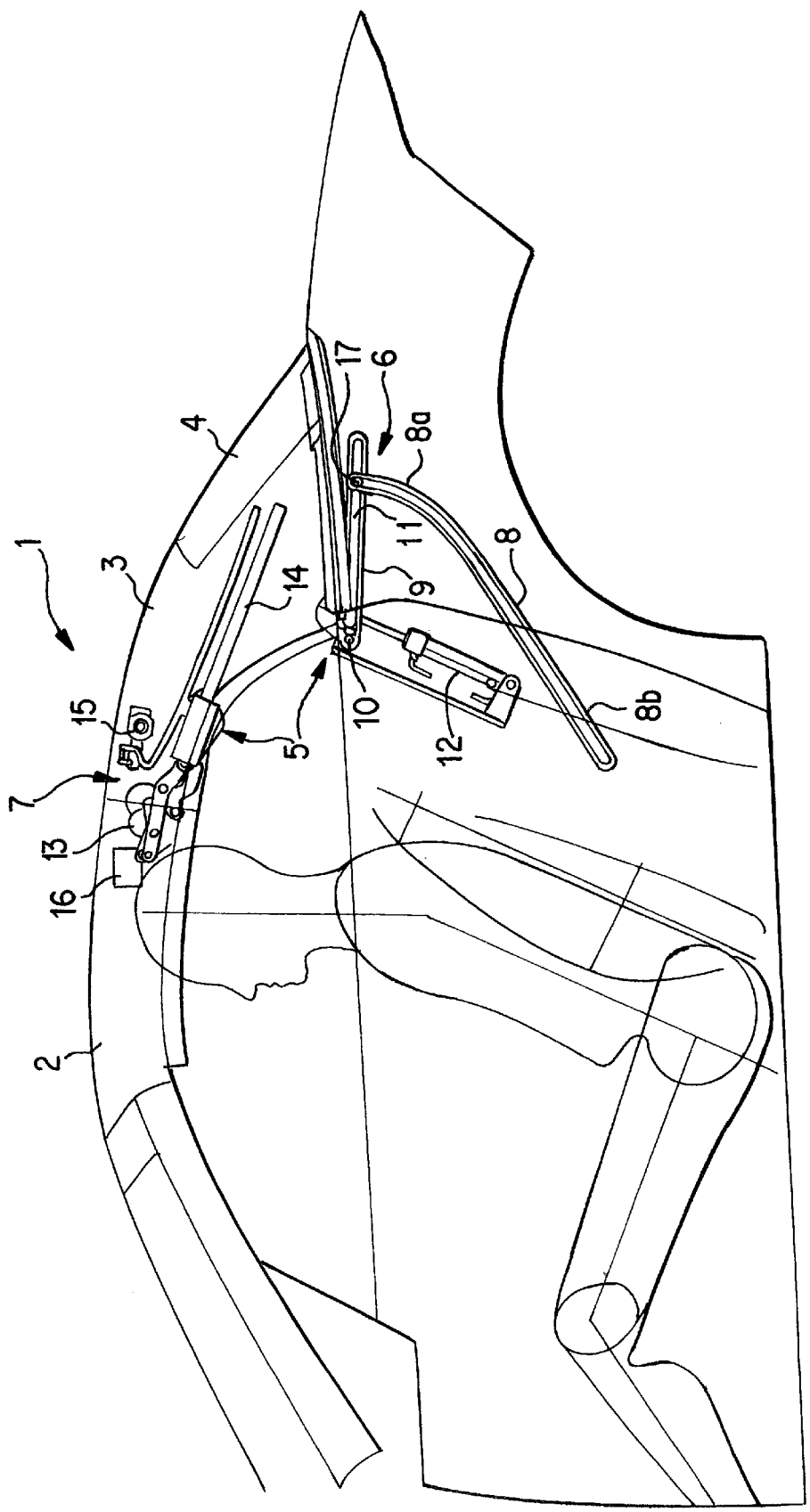
FIGS. 1 to 5 are side views of a hardtop vehicle roof with two rigid roof sections in accordance with the present invention in various successive phases between a closed position and a deposited position.

The hardtop vehicle roof 1 illustrated in FIG. 1 in the closed position consists of a forward roof section 2 facing the forward side of the vehicle and a rearward roof section 3, which is adjacent to the rearward side of the vehicle and into which a rear window 4 is integrated. The roof 1 also consists of a kinematic adjusting system designated generally by numeral 5 which comprises diverse levers, control arms and actuators in order to be able to adjust the vehicle roof 1 between a closed position and a deposited position. The kinematic adjusting system 5 consists of a first adjusting device 6 by way of which the rearward roof section 3 can be acted upon, as well as of a second adjusting device 7 by way of which the relative movement of the forward roof section 2 with respect to the rearward roof section 3 is carried out. The first adjusting device 6 for the movement of the rearward roof section 3 comprises a first guide link 8 which is connected in a vehicle-fixed manner with the body of the vehicle; a second guide link 9 which is held to be swivellable about a vehicle-fixed axis of rotation 10; a guiding element 11 which is fixedly connected with the rearward roof section 3 and which is guided in the first as well as the second guide link 8 and 9; and a control element 12 by way of which the angular position of the swivellable guide link 9 can be adjusted.

The second adjusting device 7, which is assigned to or associated with the adjustment of the forward roof section 2 relative to the rearward roof section 3, comprises an articulated connection 13 which is constructed particularly as a kinematic four-bar mechanism; a slide rail 14 which is connected with the rearward roof section 3 and on which the articulated connection 13 is displaceably held, as well as control elements 15, 16 for driving the articulated connection 13 or for implementing the articulated connection 13 on the slide rail 14.

The first guide link 8 of the adjusting device 6 has a section 8a, which is bent in shape of a divided circle, as well as an adjoining linear section 8b. The first guide link 8, like the second guide link 9, is constructed as an oblong-hole link consisting of two parallel-guided rods, between which a guide groove extends in which a projection, a pin, or similar device of the guiding element 11 is guided which is a fixed component of the rearward roof section 3. The second guide link 9, which is swivellably disposed about the rotation axis 10, is constructed in a straight line, i.e., rectilinear.

Instead of guide links, guide rails can also be used on which a guiding collar is adjustably guided which is part of the rearward roof section.

Figure 2:
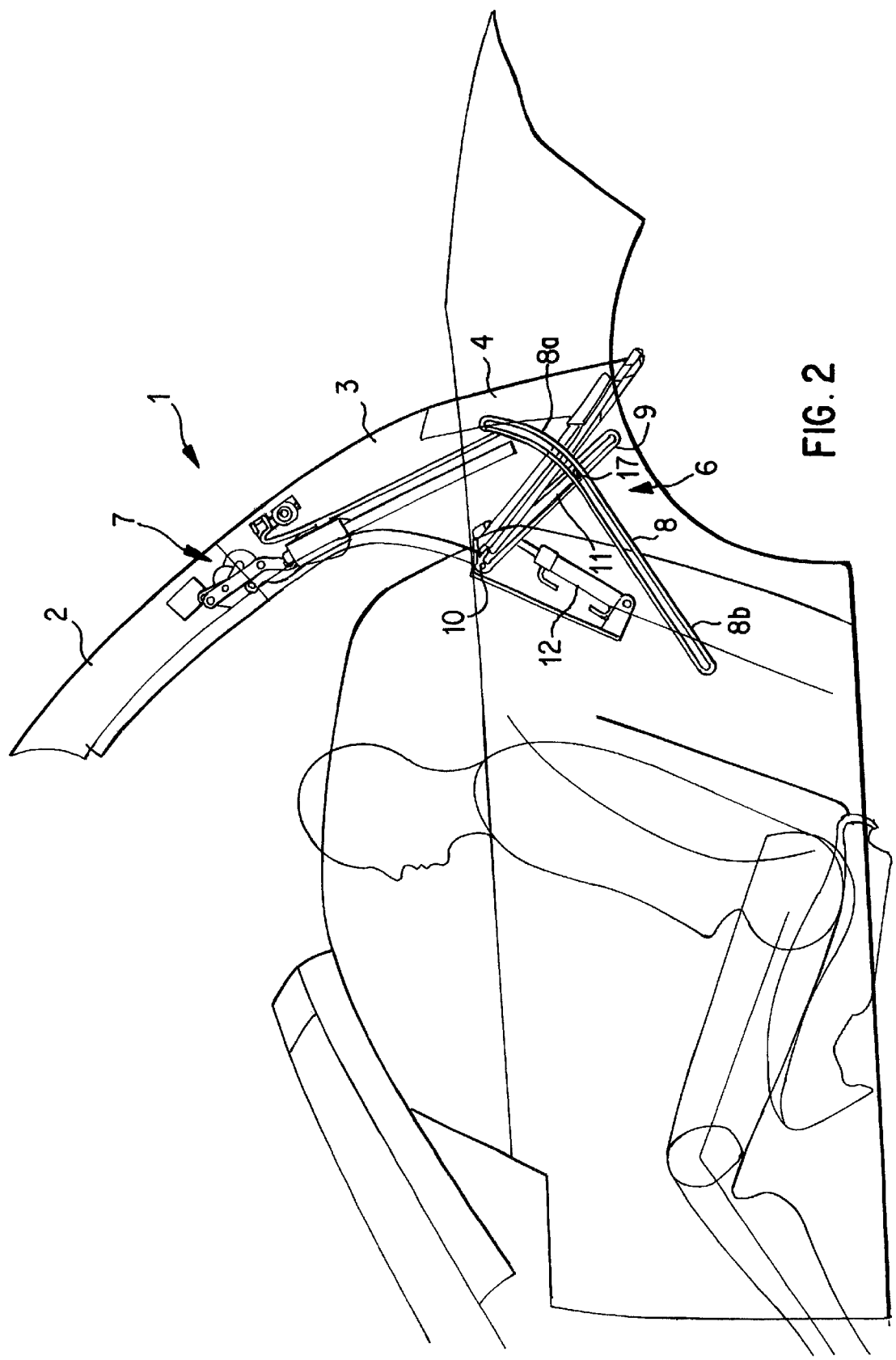

In FIG. 2, the vehicle roof 1 is illustrated in a partially opened position, in which case only a swivelling of the rearward roof section 3 has taken place. In contrast, the relative position between the forward and the rearward roof section 2 and 3 has not changed so that the forward roof section 2, and the rearward roof section 3 are still situated in a common roof plane. The rearward roof section 3 is swivelled by actuating the control element 12 which is applied to the second guide link 9 swivellably disposed about the rotation axis 10, and in which guide link 9 the guiding element 11 is displaceably disposed. During the transition from the closed position illustrated in FIG. 1 into the intermediate position illustrated in FIG. 2, a rotational movement of the rearward roof section 3 takes place exclusively, during which also the guiding element 11 of the rearward roof section 3 carries out an exclusive rotational movement about the rotation axis 10. During this movement, a pin 17 of the guiding element 11 is guided into the partial-circle-shaped section 8a of the first guide link 8.

Figure 3:
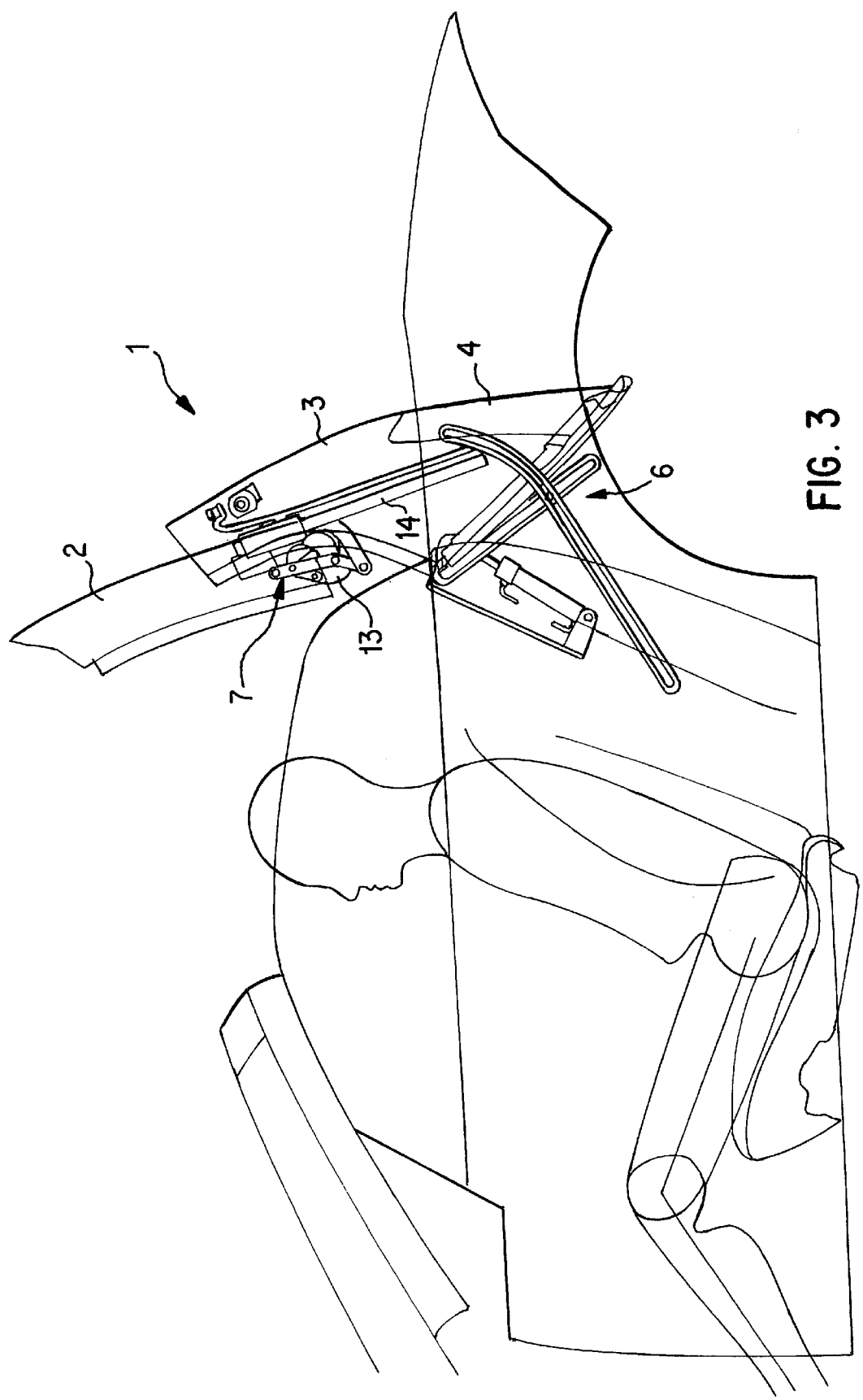

In FIG. 3, the vehicle roof 1 illustrated in a position which follows the intermediate position illustrated in FIG. 2. Following the first opening movement, which is carried out as a pure swivelling movement and which is illustrated in FIG. 2, a tilt-out movement of the forward roof section 2 with respect to the rearward roof section 3 takes place in FIG. 3 by operating the adjusting device 7. During this tilt-out movement, which is illustrated in FIG. 4, the position of the rearward roof section 3 relative to the vehicle body is maintained.

According to FIG. 3, the articulated movement 13 of the adjusting device 7 is first operated, whereby the forward roof section 2 is displaced from its original position parallel in the direction of the vehicle interior and is simultaneously moved slightly into a partially overlapping position with the rearward roof section 3.

Figure 4:
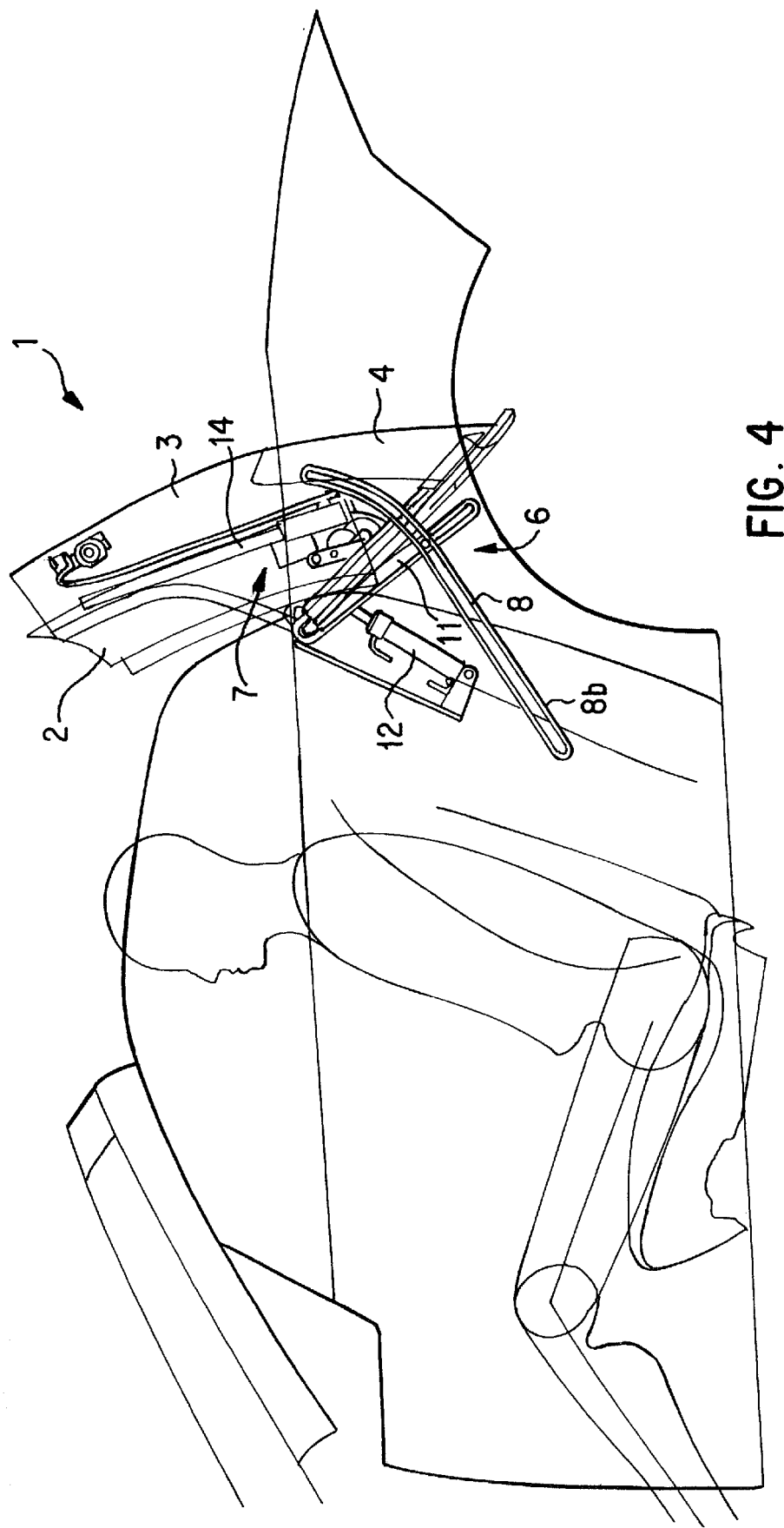

During the adjusting movement from the position illustrated in FIG. 3 into the position illustrated in FIG. 4, the forward roof section 2 is translationally displaced so far along the slide rail 14 that the forward roof section 2 is covered by the rearward roof section 3. The slide rail 14 is situated essentially parallel to the roof plane of the rearward roof section 3. During the displacing movement along the slide rail 14, the position of the rearward roof section 3 with respect to the vehicle body is maintained unchanged.

Figure 5:
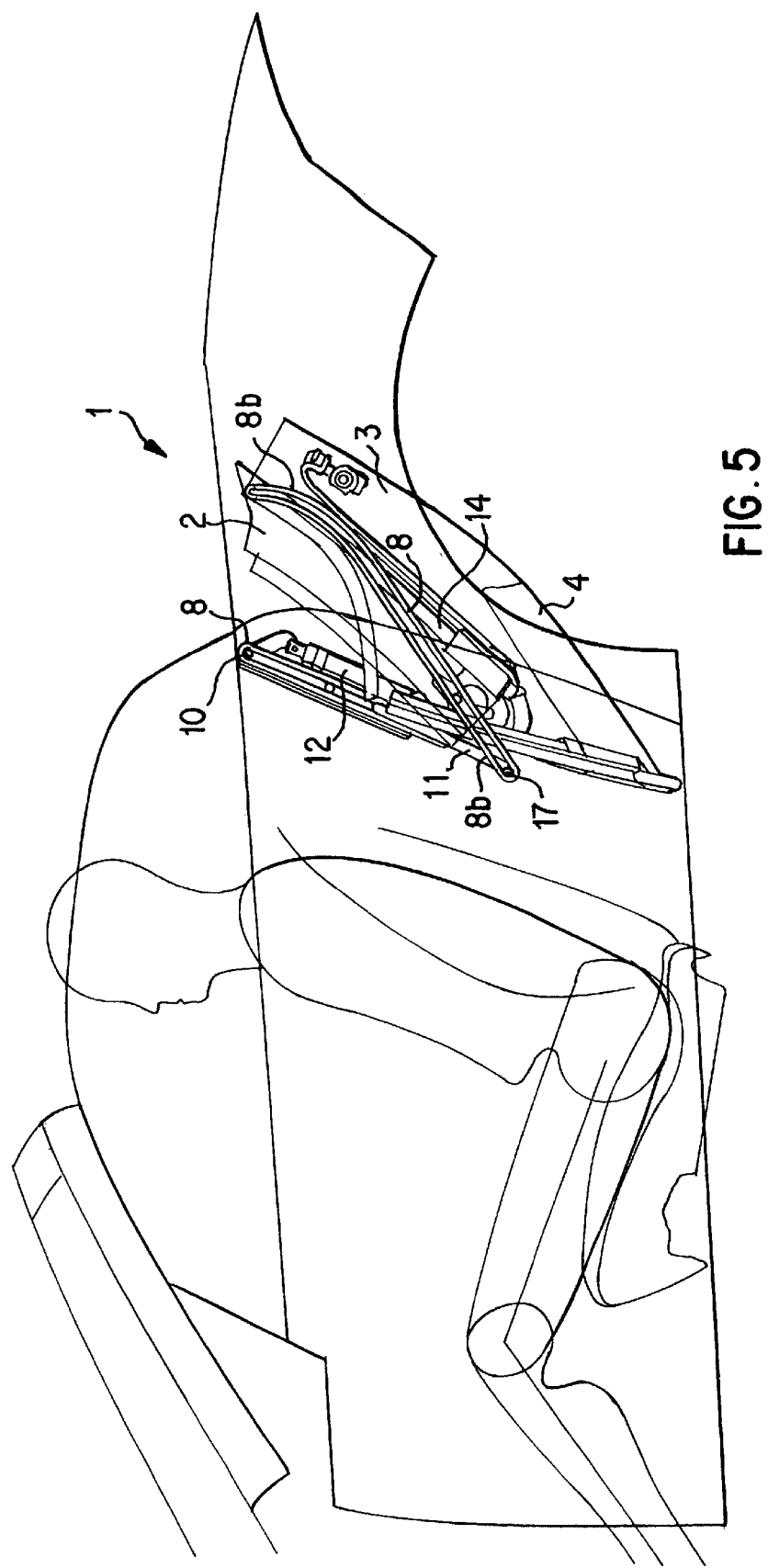

In FIG. 5, the hardtop vehicle roof 1 is illustrated in the deposited position, in which the forward roof section 2, the rearward roof section 3 as well as the entire kinematic adjusting mechanism 5 are stored in a depositing space which is situated between the vehicle interior and the vehicle trunk. During the transition from the intermediate position illustrated in FIG. 4 into the deposited position according to FIG. 5, the adjusting device 6 is operated so that the rearward roof section 3 can be adjusted. During this adjusting movement, the relative position between the forward and rearward roof section 2, 3 is maintained unchanged.

During the last phase of the transition into the deposited position, the guiding element 11 slides along by its pin 17 in the linear section 8b of the first, vehicle-fixed guide link 8 to the end-side stop. Simultaneously, the opposite face of the guiding element 11 is displaced in the second guide link 9 which, by being acted upon by the control element 12, is swivelled further about the rotation axis 10. The simultaneous displacement of the guiding element in the two guide links 8, 9, taking into account the swivelling movement of the second guide link 9, leads to a combined translational and rotatory depositing movement of the rearward roof section 3 as well as of the roof section 2 which is fixedly connected in this phase with the rearward roof section 3.

The sequence of movements between the rearward roof section 3 and the vehicle body as well as between the forward and the rearward roof section 2, 3 is mutually coordinated by a coordinated drive by way of the control elements 12, 15 and 16.

Figure 6:
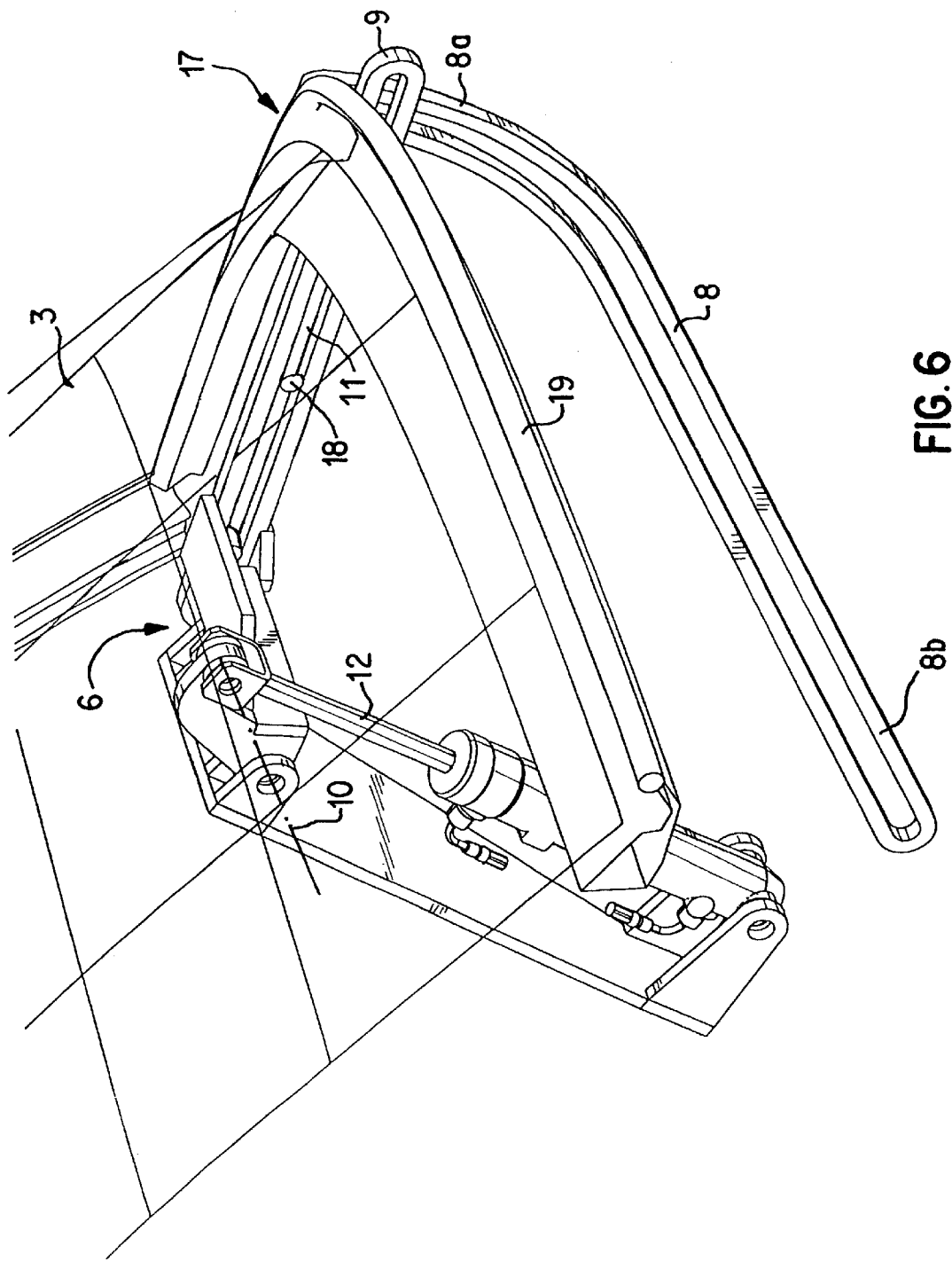
FIGS. 6 to 8 are enlarged isolated views of the adjusting device of the present invention between the vehicle body and the rearward roof section in three phases between a closed position and a deposited position.
Figure 7:
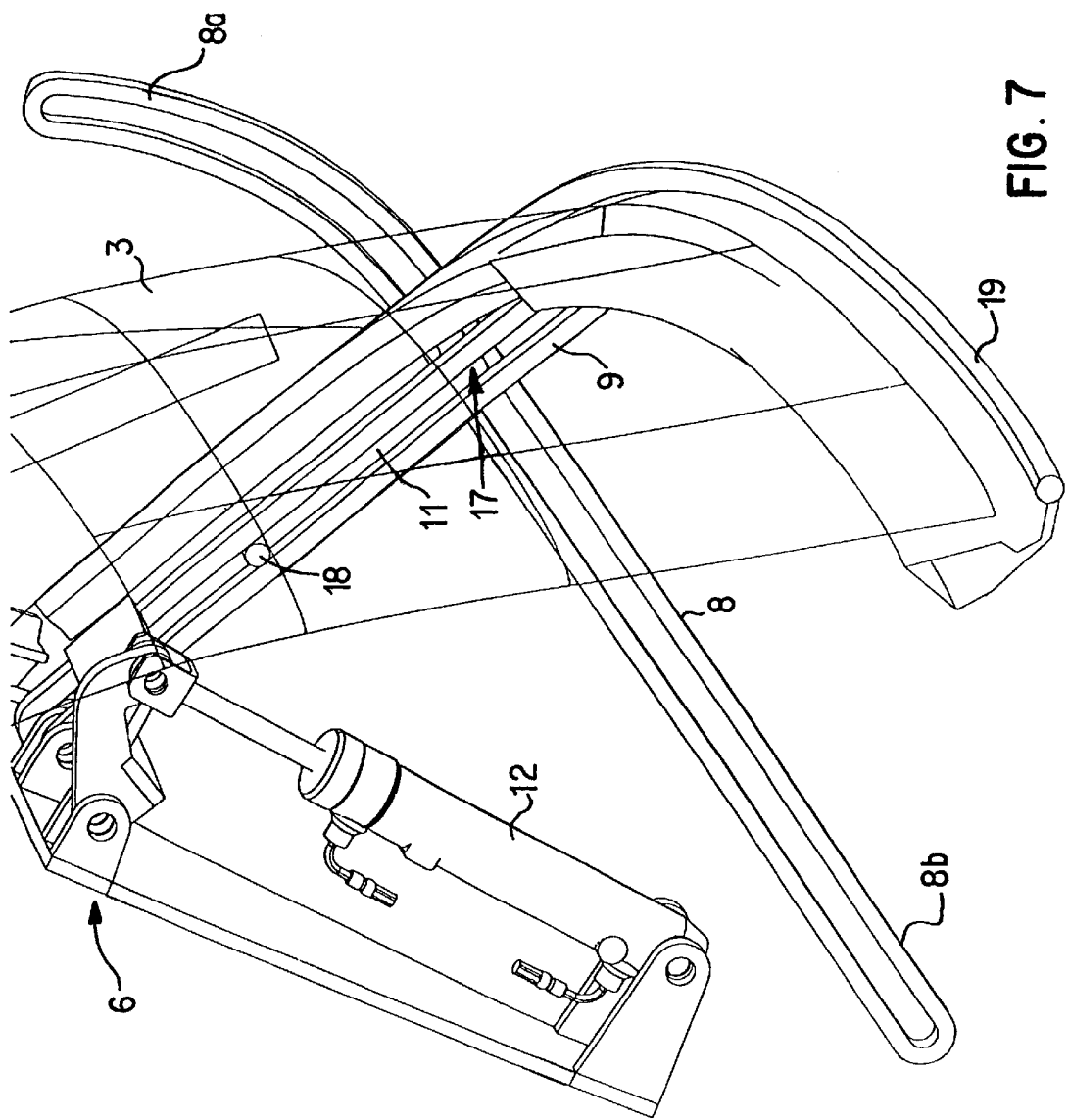
Figure 8:
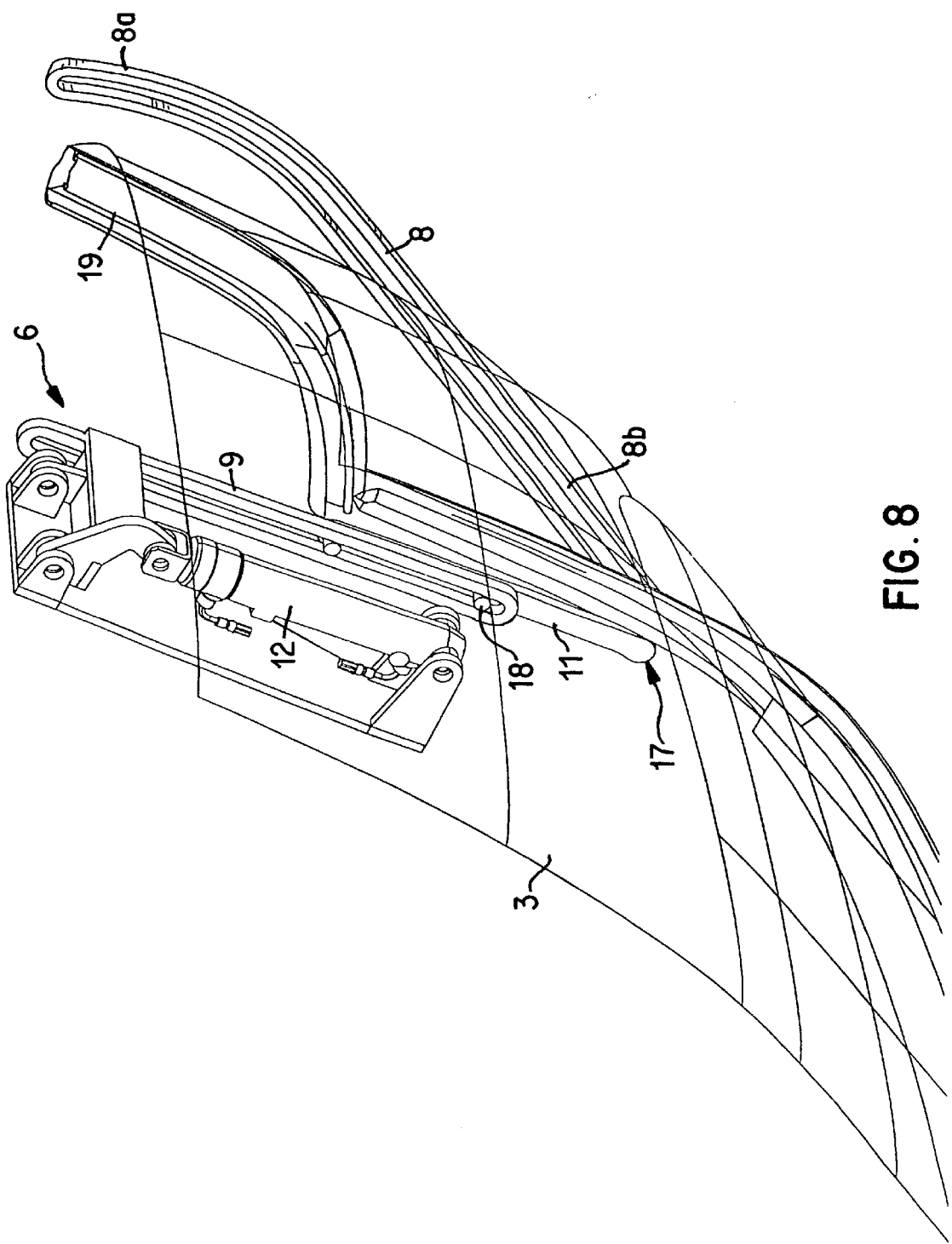

FIGS. 6, 7 and 8 are enlarged representations of the adjusting device 6 for swivelling and displacing the rearward roof section 3 with respect to the vehicle body. In FIG. 6, the rearward roof section 3 is illustrated in the closed position in which the control cylinder of the control element 12 has fully moved out and the second guide link 9, which is swivellable about the rotation axis 10, takes up an approximately horizontal position. The guiding element 11, which is fixedly connected with the rearward roof section 3, is guided by a first pin 17 covered by a transverse bow 19 of the rearward roof section 3 in the vehicle-fixed guide link 8 and is guided by a second pin 18 in the swivellable guide link 9. The first pin 17 of the guiding element 11 is in a stop position in the area of the face of the curved section 8a of the guide link 8; and the second pin 18 is situated approximately in the center of the second guide line 9. The linear section 8b of the vehicle-fixed guide link 8 points diagonally downward in the direction of the vehicle interior, and the partial-circle-shaped section 8a points correspondingly upward.

The intermediate position according to FIG. 7 corresponds to the roof position shown as FIG. 2, in which the swivellable guide link 9 was swivelled so far downward by way of the control element 12 that the vehicle roof is transferred into a position opening up the vehicle interior. In this position, the pin 17 of the guiding element 11 of the rearward roof section 3 has moved completely through the partial-circle-shaped section 8a of the vehicle-fixed guide link 8.

FIG. 8 shows the vehicle roof in the deposited position, in which the rearward roof section 3 is lowered into the depositing space behind the vehicle occupant interior. In the deposited position, the control cylinder of the control element 12 has completely moved in, and the swivellable guide link 9 points approximately vertically downward. The guiding element 11 has been displaced so far in the swivellable guide link 9 that the pin 18 of the guiding element 11 guided in the guide link 9 is situated in the area of the face-side stop of the guide link 9. Simultaneously, the opposite pin 17 of the guiding element 11 has been displaced along the linear section 8b of the vehicle-fixed guide link 8 and is now situated in the area of the face-side stop of the linear section 8b. The rearward roof section 3 is situated in the depositing space and points steeply downward.

Figure 9:
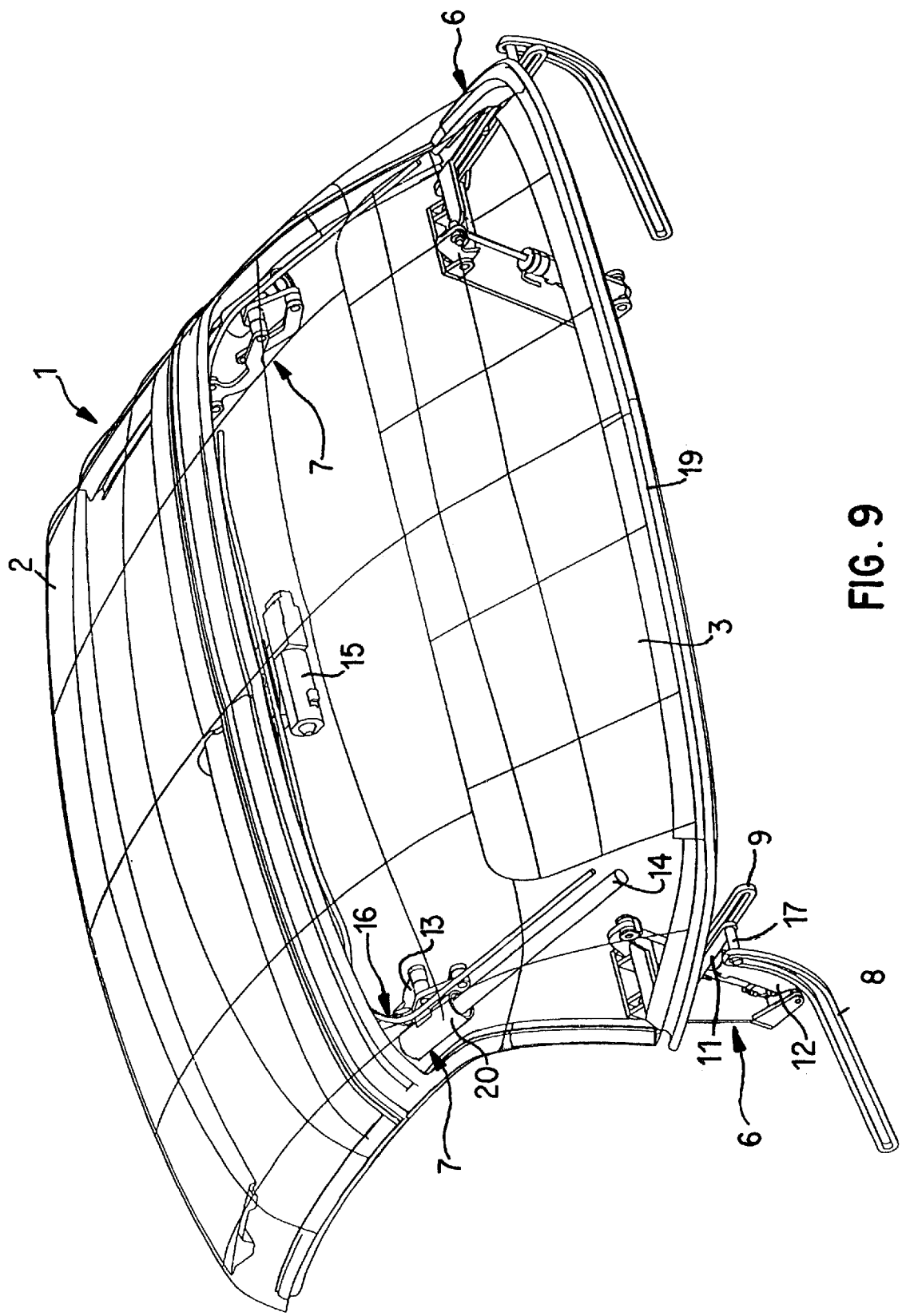
FIG. 9 is a perspective view of the vehicle roof of the present invention in the closed position.

The perspective overall view according to FIG. 9 illustrates that, with the exception of the control element 15, which is responsible for the displacement of the forward roof section 2 on the slide rail 14 and which exists singularly, the entire arrangement of the vehicle roof 1 has a mirror symmetrical construction. In the area of both roof sides, one adjusting device 6 respectively is provided for transferring the rearward roof section 3 into the depositing space, and one adjusting device 7 is provided for the relative movement of the forward roof section 2 with respect to the rearward roof section 3. A sliding sleeve 20 is assigned to the adjusting device 7 and is slidingly held on the slide rail 14. The slide rail 14 is fixedly connected with the rearward roof section 3; in contrast, the sliding sleeve 20 is connected by way of the articulated connection 13 with the forward roof section 2.

Figure 10:
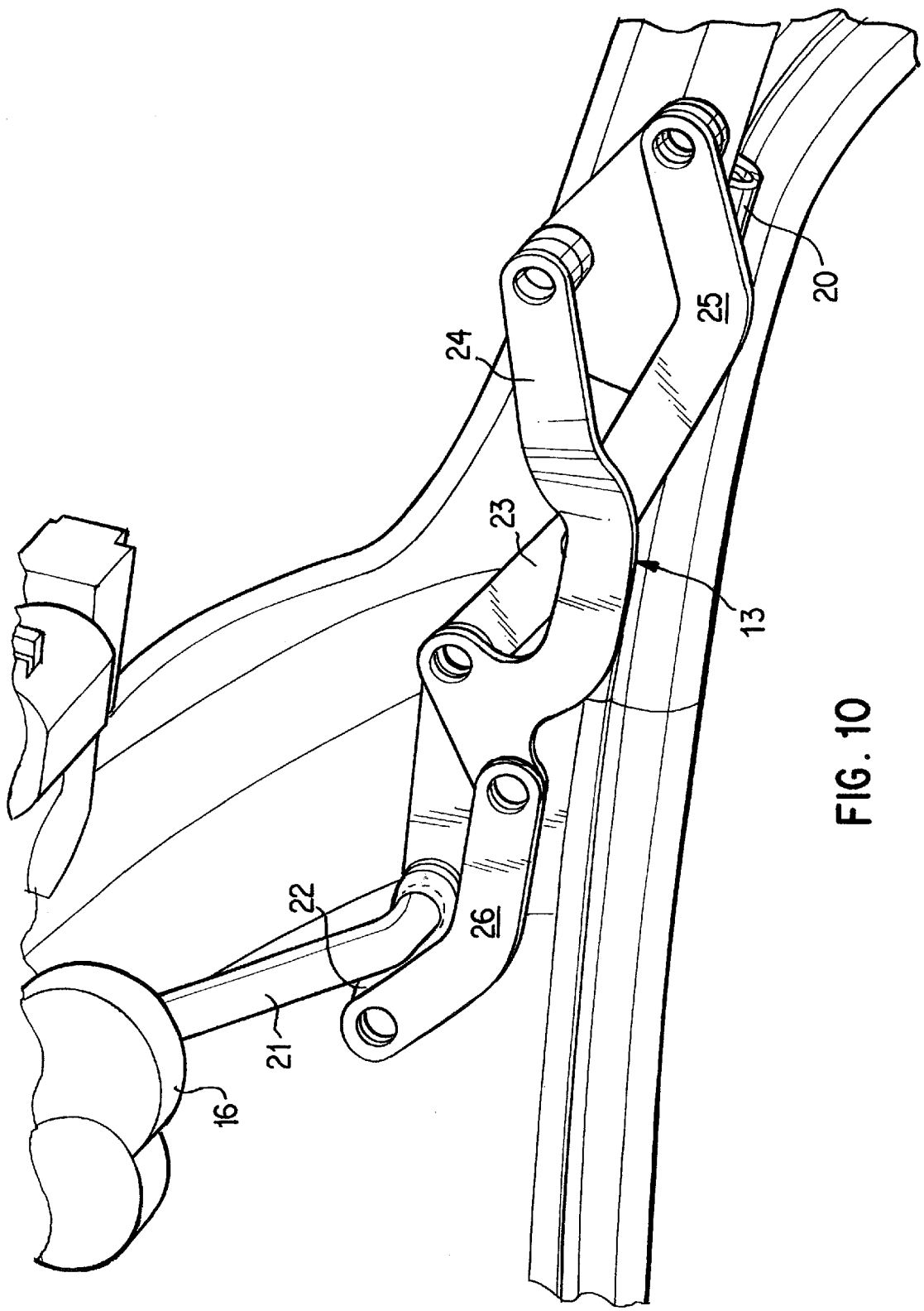
FIG. 10 is an enlarged isolated view of the adjusting device shown in FIGS. 6 to 8 between the forward and the rearward roof section.

FIG. 10 is an enlarged view of the articulated connection 13 which permits a lowering of the forward roof section to be carried out with respect to the rearward roof section 3. The articulated connection 13, which is fastened on the sliding sleeve 20 and is to be operated by the control element 16 by way of driving control arms 21, 22, has control arms 24, 25 which by way of receiving device 23, are connected in an articulated manner with the forward roof section 2. The transmission of the driving movement from the control element 15 takes place by way of the driving control arms 21, 22 as well as a connecting control arm 26 to the control arm 24 of the articulated mechanism.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Hardtop vehicle roof, comprising a forward roof section, a rearward roof section and a kinematic adjusting system for adjusting the roof sections between a closed position covering a vehicle interior and a deposited position opening up the vehicle interior, the kinematic adjusting system comprising a vehicle-fixed first guide link and a guiding element operatively guided in the guide link and connected with one of the roof sections; and a second guide link swivellably mounted about a vehicle-fixed rotation axis, wherein the guiding element is slidingly guided in the first and second guide links.

2. Hardtop vehicle roof according to claim 1, wherein the rearward roof section is operatively guided by the two guide links.

3. Hardtop vehicle roof according to claim 1, wherein the rearward roof section is swivellable about an axis which is guided in the second guide link.

4. Hardtop vehicle roof according to claim 1, wherein the two guide links are angularly arranged with respect to one another.

5. Hardtop vehicle roof according to claim 1, wherein the first guide link has a partial-circle-shaped section with a center point which coincides with the rotation axis of the second guide link.

6. Hardtop vehicle roof according to claim 5, wherein a linear section adjoins the partial-circle-shaped section of the first guide link.

7. Hardtop vehicle roof according to claim 1, wherein the second guide link is configured to be acted upon by a control element.

8. Hardtop vehicle roof according to claim 1, wherein the forward roof section is operatively held by an articulated connection on the rearward roof section.

9. Hardtop vehicle roof according to claim 8, wherein the forward roof section is arranged to be transferable parallel to the rearward roof section.

10. Hardtop vehicle roof according to claim 8, wherein the forward roof section is arranged to be deposited in the deposited position between the vehicle interior and the rearward roof section.

11. Hardtop vehicle roof according to claim 8, wherein the articulated connection is a kinematic four-bar section.

12. Hardtop vehicle roof according to claim 8, wherein the articulated connection is operatively associated with one of the roof sections and is slidingly guided on a slide rail connected with the other of the roof sections.

13. Hardtop vehicle roof according to claim 12, wherein the slide rail extends approximately parallel to a roof plane of the rearward roof section.

14. Hardtop vehicle roof according to claim 12, wherein one drive respectively operatively acts upon the articulated connection and displacement on the slide rail.

* * * * *